US00RE46006E

(19) United States
(12) Reissued Patent
Uekihara

(10) Patent Number: US RE46,006 E
(45) Date of Reissued Patent: May 24, 2016

(54) POWER SUPPLY ADAPTER

(71) Applicant: Masanori Uekihara, Kazu (JP)

(72) Inventor: Masanori Uekihara, Kazu (JP)

(73) Assignee: GMAC INC., Fukuoka (JP)

(21) Appl. No.: 29/524,116

(22) Filed: Apr. 16, 2015

Related U.S. Patent Documents

Reissue of:
(64) Patent No.: Des. 682,203
Issued: May 14, 2013
Appl. No.: 29/360,252
Filed: Apr. 22, 2010

(30) Foreign Application Priority Data

Oct. 22, 2009 (JP) ..... 2009-024692

(51) LOC (10) Cl. ..... 13-02
(52) U.S. Cl.
USPC ..... D13/110; D13/138.1
(58) Field of Classification Search
USPC ..... D13/110, 123, 133, 138.1, 138.2, 184
CPC .... H01R 13/24; H01R 13/501; H01R 13/595; H01R 13/50; H01R 13/506; H01R 13/504
See application file for complete search history.

(56) References Cited

U.S. PATENT DOCUMENTS

D144,877 S * 5/1946 Sundt ..... D13/138.1
2,675,531 A * 4/1954 Sams et al. ..... H01R 4/2404 439/427
D196,584 S * 10/1963 Alberts ..... D13/138.1
D257,035 S * 9/1980 Ostrelich ..... D13/138.1
D258,429 S * 3/1981 Buckler ..... D13/138.1
D431,020 S * 9/2000 Harjunpaa et al. ..... D13/107
D635,919 S * 4/2011 Ahola et al. ..... D13/138.1
D640,632 S * 6/2011 Smith et al. ..... D13/138.1
2009/0289596 A1* 11/2009 McGinley et al. .... H02J 7/0042 320/111
2011/0254506 A1* 10/2011 McGinley et al. ... H01R 31/065 320/111

* cited by examiner

*Primary Examiner* — Phillip S Hyder
(74) *Attorney, Agent, or Firm* — McDermott Will & Emery LLP

(57) CLAIM

The ornamental design for a power supply adapter, as shown and described.

DESCRIPTION

FIG. 1 is a perspective view of a power supply adapter showing a new design;
FIG. 2 is a front elevational view thereof;
FIG. 3 is a left side elevational view thereof;
FIG. 4 is a right side elevational view thereof; and,
FIG. 5 is a top plan view thereof.
The back view is a mirror image of the front view, and the bottom plan view is a mirror image of the top plan view.

1 Claim, 1 Drawing Sheet

Figure 1:
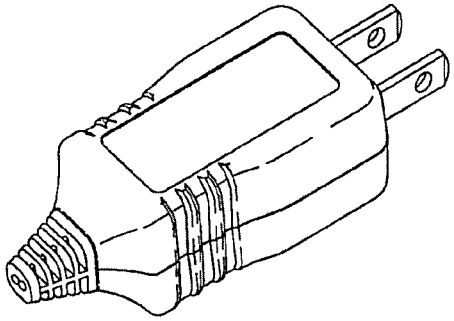
Figure 2:
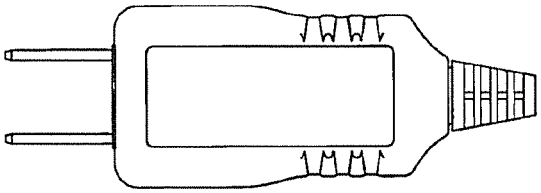
Figure 3:
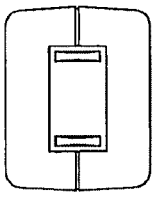
Figure 4:
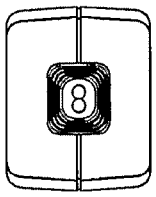
Figure 5:
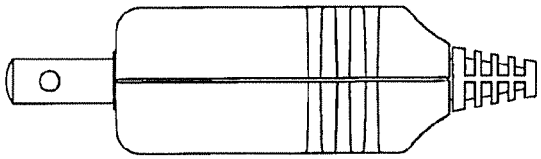

Matter enclosed in heavy brackets [ ] appears in the original patent but forms no part of this reissue; matter printed in italics indicates the additions made by reissue.